Figure 1:
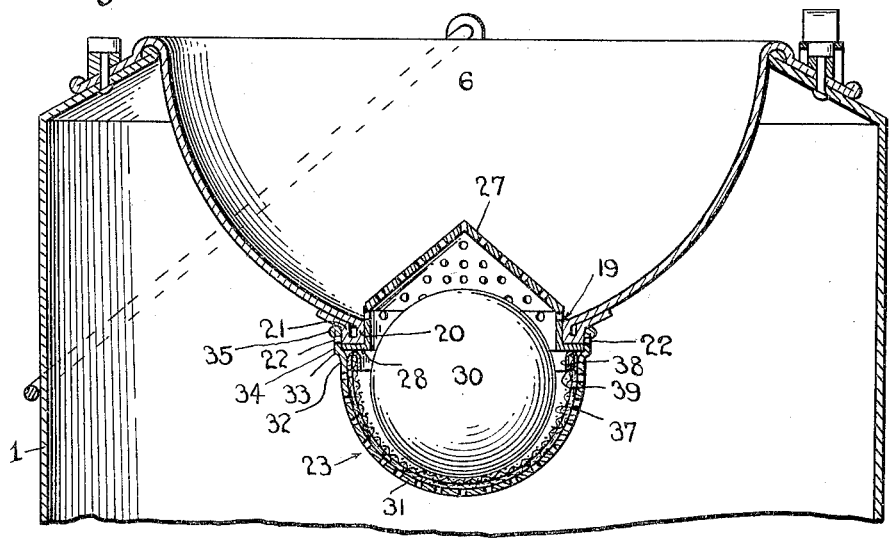

J. H. KING.
MILK PAIL.
APPLICATION FILED OCT. 13, 1913.

1,088,593.

Patented Feb. 24, 1914.

2 SHEETS—SHEET 1.

Witnesses
L. B. James
C. Meenker

Inventor
J. H. King
By H. B. Willson & Co.
Attorneys

J. H. KING.
MILK PAIL.
APPLICATION FILED OCT. 13, 1913.

1,088,593.

Patented Feb. 24, 1914.
2 SHEETS—SHEET 2.

Witnesses

Inventor
J. H. King.
By H. B. Willson & Co.
Attorneys

UNITED STATES PATENT OFFICE.

JOHN HEUSTIS KING, OF MOBILE, ALABAMA.

MILK-PAIL.

1,088,593. Specification of Letters Patent. Patented Feb. 24, 1914.

Application filed October 13, 1913. Serial No. 794,931.

*To all whom it may concern:*

Be it known that I, JOHN HEUSTIS KING, a citizen of the United States, residing at Mobile, in the county of Mobile and State of Alabama, have invented certain new and useful Improvements in Milk-Pails; and I do declare the following to be a full, clear, and exact description of the invention, such as will enable others skilled in the art to which it appertains to make and use the same.

This invention relates to milk cans as employed in the dairy, and more especially to the rotary closures therefor; and the object of the same is to produce certain improvements in my former United States Patent Number 1060100, dated April 29, 1913.

With this and other objects in view, the invention consists in the construction set forth and claimed below and as shown in the drawings wherein—

Figure 2:
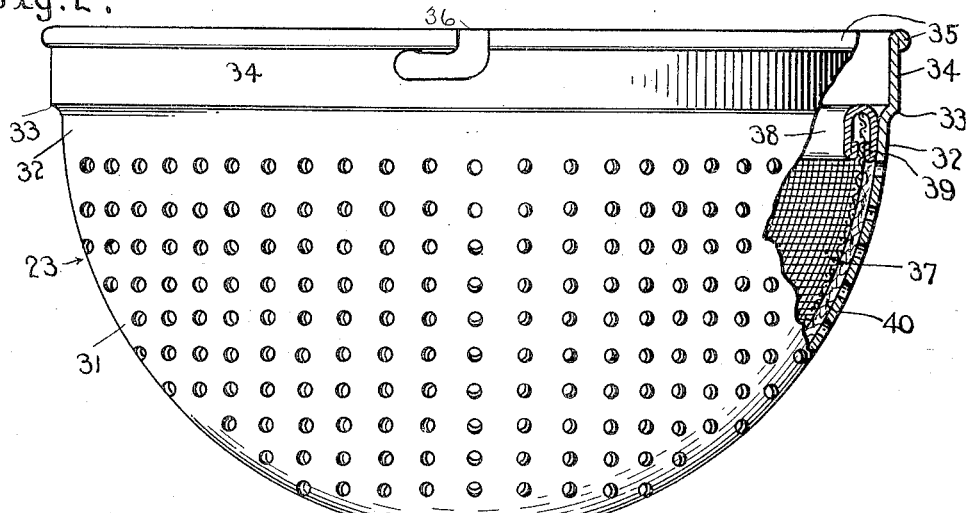
Figure 3:
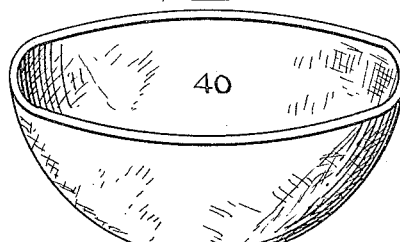
Figure 4:
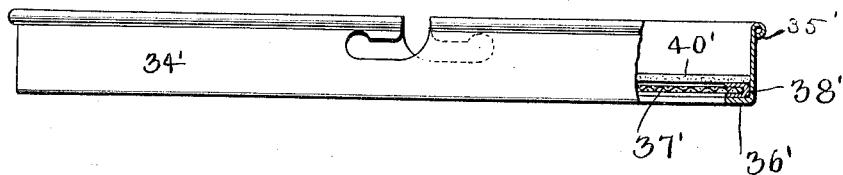
Figure 5:
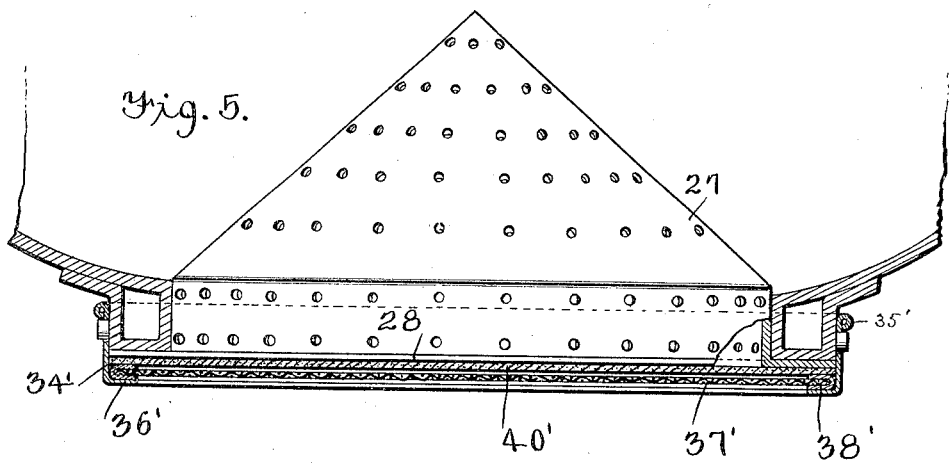
Figure 6:
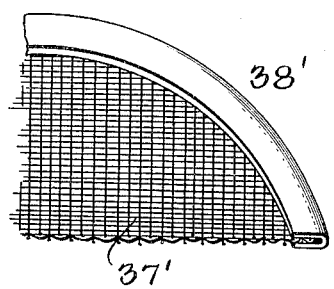
Figure 7:
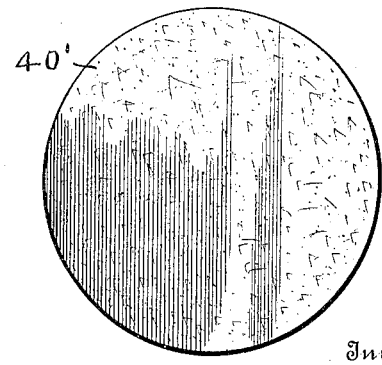

Figure 1 is a vertical section through the upper end of a milk pail provided with my invention; Fig. 2 is an enlarged side elevation of the valve; and Fig. 3 is a reduced perspective detail of the fabric strainer. Fig. 4 is a side elevation, partly broken away, showing a different form of this invention; Fig. 5 is a central vertical section showing this form of the invention in place; Fig. 6 is a fragmentary sectional detail which will be referred to hereinafter, and Fig. 7 is a plan view of the fabric filtering disk.

The milk pail forming the subject matter of the present invention has a body 1 and a cup-shaped mouth or upper end 6 connected with said body in any suitable way, preferably by the means illustrated and described in my former patent but which need not be amplified herein. Said mouth 6 has an opening 19 at its bottom surrounded by a downturned annular flange 20, and around the flange the mouth carries a collar 21 having radially projecting studs 22 at opposite points adapted to engage bayonet-joint slots in the combined strainer and valve-supporting member which constitutes the subject matter of this invention. Within said member will be mounted a ball-shaped valve 30, and the same will be loose beneath a conical strainer 27 whose lower edge carries a radial flange 28—all as described in my former patent above referred to.

Coming now to the details of the improvements forming the subject matter of this application, the numeral 23 designates a bowl having a perforated body 31, an imperforate band 32 just above its perforations, an outwardly bent shoulder 33 just above said band, and an upright flange 34 above said shoulder, preferably beaded around its upper edge as at 35, which flange has the slot 36 above referred to; and by preference this entire member is stamped from one piece of sheet metal. The imperforate band 32 should be about one-quarter of an inch wide so that there is that distance between the shoulder 33 and the upper most of the perforations 31, for a purpose to appear below. Within this member is disposed a mesh-strainer 37 whose body is of fine wire mesh, hemispherical as shown, and slightly smaller externally than the interior of the body of the bowl 23; and whose upper edge is formed into an imperforate collar 38 by bending a strip of sheet metal onto itself as seen in Fig. 2 and turning in its edges as shown at 39. The size of parts is such that this collar stands opposite and fits closely within the band 32 of the bowl when these two members are assembled, and at this time the upper edge of said collar is flush with the upper face of said shoulder. This forms a seat upon which rests the flange 28 of the strainer 27 above referred to, said flange being clamped between said seat and the collar 21. The third member consists of a fabric strainer 40, preferably formed of felt, cotton, or any suitable fabric cut to correspond with the size and shape of the space between the mesh-strainer 37 and the interior of the bowl-body 23; and the upper end or edge of this strainer should rise to the lower edge of the band 32 when all parts are assembled. The ball valve 30 is then dropped into place, and when the milk pail is inverted this valve closes the opening through the strainer 27, but at other times this ball rests within the mesh-strainer 37 forming part of the present invention and the milk may of course flow around the ball and through said mesh, and then through the fabric 40, and finally through the perforations in the bowl 23 and into the interior of the pail. By this means the milk is strained when it is put into the pail, whether it is poured into the same or is delivered into the cup-shaped mouth direct from the cow. To empty the pail, obviously its upper end is taken off, if indeed it is not provided with some other means not necessary to be described in this specification. The essential idea is that a bowl-shaped valve-receiving strainer be produced which is detachably connected with the outlet end of the cup 6 forming the mouth of this pail, and which when in place fits loosely around the ball 30 so that if the latter lies in this bowl the milk may flow into the can but if the can be tilted or inverted the ball rolls out of the bowl and closes the exit to prevent the spilling of the milk. It will not be necessary for the purposes of this specification to give further details as to the materials and proportions and parts, nor as to the operation and utility of the invention.

In the form of my invention shown on Sheet 2 of the drawings the same body and mouth are used, and the same strainer 27, but the ball valve 30 is omitted and the structure of the parts surrounding it is somewhat changed. That is to say, instead of the bowl 23 with its peculiar shaped mouth, I employ in this case an imperforate ring 34' having a beaded upper edge 35' and the same bayonet slots in its body as above described, and the lower edge of the ring is bent inward and beaded as at 36'. Overlying this bead or shoulder is a strainer having a wire mesh body 37' surrounded by an imperforate collar 38' formed by bending a strip of sheet metal onto itself and crimping it tightly around the edge of the mesh strainer 37' as seen in Fig. 6. Overlying this strainer in turn is a disk 40' composed of fabric, felt, or any suitable similar material cut to the proper size to fit within the ring 34'. The fabric strainer and the mesh strainer are both held upon the bead or shoulder 36' by the radial flange 28 of the strainer 27 as above described. The two strainers so held in place are by preference flat as best seen in Fig. 5 and therefore the ball valve 30 is omitted. The coarse or perforated strainer 27 here again serves the purpose of taking any large particles out of the milk, whereas the real straining is done by the fabric or felt disk and the mesh strainer supports the disk. All parts are removable for cleansing or repair as above described.

What is claimed as new is:

1. The herein described strainer comprising an outer member of sheet metal having a bowl-shaped body perforated except for a band around its upper edge, and an imperforate attaching flange rising from said band; a wire-mesh strainer having a collar at its upper end consisting of a strip of sheet metal folded on itself and with its edges inturned and the entire collar being of a size to fit closely within said band, and a wire-mesh body clamped between said inturned edges and of a size to conform closely with but be spaced slightly from the interior of said perforated bowl when these elements are assembled; and a fabric strainer disposed between the said two elements and rising to the lower edge of said collar.

2. In a milk pail, the combination with a body having a cup-shaped mouth provided with an opening at its bottom, a conical perforated strainer over said opening, and a collar surrounding the lower end of the strainer and secured to the mouth and provided with oppositely disposed studs; of a bowl having a perforated body, an imperforate band above its perforations, an outwardly projecting shoulder above said band, and an upright flange above said shoulder provided with bayonet-joint slots adapted to engage said studs, a mesh-strainer within said bowl having a body of wire mesh and an imperforate collar around its upper edge adapted to fit closely within said band and to register with said shoulder to form a seat for the conical strainer within the pail, a fabric strainer between the mesh strainer and the bowl, and a ball loosely mounted within the latter, substantially as described.

3. In a milk pail, the combination with a body having a cup-shaped mouth provided with an opening in its bottom, a collar surrounding the opening and provided with oppositely disposed studs, and a conical perforated strainer having a radial flange at its lower end; of an imperforate ring having bayonet slots adapted to engage said studs and its lower edge turned inward into a shoulder, a mesh strainer removably overlying said shoulder, and a fabric strainer removably overlying said mesh strainer and held in place by the radial flange at the base of said perforated strainer.

In testimony whereof I have hereunto set my hand in presence of two subscribing witnesses.

JOHN HEUSTIS KING.

Witnesses:
AUBREY BOYLES,
LEON LEVINSOHN.

---

Copies of this patent may be obtained for five cents each, by addressing the "Commissioner of Patents. Washington, D. C."